US011526014B2

(12) United States Patent
Sheng (10) Patent No.: US 11,526,014 B2
(45) Date of Patent: Dec. 13, 2022

(54) NEAR EYE DISPLAY PROJECTOR

(71) Applicant: Texas Instruments Incorporated, Dallas, TX (US)

(72) Inventor: Zhongyan Sheng, Allen, TX (US)

(73) Assignee: TEXAS INSTRUMENTS INCORPORATED, Dallas, TX (US)

(\*) Notice: Subject to any disclaimer, the term of this patent is extended or adjusted under 35 U.S.C. 154(b) by 70 days.

(21) Appl. No.: 16/930,146

(22) Filed: Jul. 15, 2020

(65) Prior Publication Data

US 2021/0018752 A1   Jan. 21, 2021

Related U.S. Application Data

(60) Provisional application No. 62/874,779, filed on Jul. 16, 2019.

(51) Int. Cl.
*G02B 27/01* (2006.01)
*F21V 8/00* (2006.01)
*G02B 5/04* (2006.01)

(52) U.S. Cl.
CPC ........... *G02B 27/0172* (2013.01); *G02B 5/04* (2013.01); *G02B 6/003* (2013.01); *G02B 6/0018* (2013.01);
(Continued)

(58) Field of Classification Search
CPC .... G02B 27/0172; G02B 5/04; G02B 6/0018; G02B 6/003; G02B 6/0001;
(Continued)

(56) References Cited

U.S. PATENT DOCUMENTS 5,309,188 A    5/1994  Burstyn
9,507,154 B2  11/2016  Komatsu et al.
(Continued)

FOREIGN PATENT DOCUMENTS

WO         2011119459 A1     9/2011
WO    WO 2018/057660 A2 *  3/2018

OTHER PUBLICATIONS

International Search Report amd Written Opinion dated Oct. 15, 2020, PCT Application No. PCT/US2020/042259, 8 pages.

*Primary Examiner* — Brent D Castiaux
(74) *Attorney, Agent, or Firm* — Michelle F. Murray; Frank D. Cimino (57) ABSTRACT

A near eye display apparatus includes: a lens having a viewing area, the lens comprising a waveguide having a waveguide input and a waveguide output optically coupled to the viewing area; an optical projector having a projector output, the optical projector comprising an illumination source optically coupled to the optical prism element and configured to provide illumination light into the optical prism element at a particular direction, a spatial light modulator optically coupled to the optical prism element and configured to receive the illumination light from the optical prism element and to reflect patterned light, the optical prism element configured to provide the patterned light to the projector output at the particular direction; and an optical folding element optically coupled between the projector output and the waveguide input, the optical folding element configured to fold an optical path of the patterned light in at least two different directions.

25 Claims, 10 Drawing Sheets

(52) U.S. Cl.
CPC  *G02B 2027/011* (2013.01); *G02B 2027/0178* (2013.01)

(58) Field of Classification Search
CPC ...... G02B 2027/011; G02B 2027/0178; G02B 2027/0114
See application file for complete search history.

(56) References Cited

U.S. PATENT DOCUMENTS

| | | | |
|---|---|---|---|
| 9,756,300 B2 | 9/2017 | Sheng | |
| 2004/0032666 A1 | 2/2004 | Baba | |
| 2016/0077338 A1* | 3/2016 | Robbins | G02B 27/4205 359/489.08 |
| 2016/0231568 A1 | 8/2016 | Saariko et al. | |
| 2016/0291326 A1* | 10/2016 | Evans | G02B 3/04 |
| 2016/0292921 A1* | 10/2016 | Evans | G06F 3/011 |
| 2017/0184860 A1* | 6/2017 | Huang | G03B 21/208 |
| 2018/0239150 A1* | 8/2018 | Yoshida | G02B 6/0076 |
| 2019/0018247 A1* | 1/2019 | Gao | G02B 30/10 |

* cited by examiner

NEAR EYE DISPLAY PROJECTOR

CROSS-REFERENCE TO RELATED APPLICATION

This application claims the benefit under 35 U.S.C. § 119(e) to U.S. Provisional Patent Application Ser. No. 62/874,779 filed Jul. 16, 2019, which is hereby incorporated by reference in its entirety herein.

TECHNICAL FIELD

This relates generally to display projectors, and more particularly to a near eye display projector.

BACKGROUND

Near eye displays are increasingly used. In a near eye display, the viewer's eye is very close to a lens, so the system is a personal imaging system. An image appears in the field of view of the user. Unlike imaging systems that project an image onto a screen or surface for viewing, in a near eye display the image is projected from a viewing area on a lens onto the human retina, where the image is perceived to be in front of the viewer. The distance from a viewing pupil on the lens to the user's eye may be only a few millimeters. Many near eye systems are provided in wearable portable devices, resembling eyeglasses or goggles.

In some examples, the system may provide an immersive viewing experience, so the viewer sees only the image projected by the system, while the immersive viewing system blocks light from other sources. Virtual reality ("VR") systems are useful for gaming, simulators, training systems, or virtual 2D or 3D viewing for movies, games, or video presentations.

Alternative systems that use near eye display are transmissive systems, where the lenses act as optical combiners. In those alternative systems, the viewer looks through the lens of the near eye display, and the lens optically combines the images provided by the system with the scene the viewer is observing. Examples are augmented reality ("AR") systems. In some systems, a user wears the AR headsets or glasses in a manner similar to sunglasses or eyeglasses, and the lenses display information that adds to ("augments") the real visual environment observed by the user while wearing the device. In other systems, such as an automotive or aerospace 61 "heads up" displays, the viewer looks into the near eye display, and the imaging system adds images to the scene in front of the viewer. In this way, the viewer can observe a scene while receiving additional information at the same time, such as vehicle speed, fuel gauges, system messages, and similar data.

An example near eye display system includes a transmissive lens that displays visual information in the form of images that are optically combined with the scene being viewed through the lens. For example, notifications can be displayed and viewed along with a scene being observed. Examples of such notifications include social media messages, text including navigation information, weather, traffic, historical or tourism information about an object or place, retail offers such as sales or advertising related to a store or place near to or being viewed by a wearer, stock quotes, sports scores or other context driven notifications or information. Interactive games can be played with an AR headset, such as "scavenger hunts" or games involving finding virtual objects at a location, or games scoring the user's ability to find a target place or object. Navigation aids can be provided with the system, such as text cues indicating directions on where to proceed to reach a destination, when to exit a freeway, where to turn, or upcoming hazards (such as indicating an accident ahead or slow traffic ahead). As the wearer moves through an environment and looks through the transmissive lens of the device, the system can augment the experience with a variety of visual information, cues or aids. The system can include a processor and can include network connections, such as cellular connections, Wi-Fi connections, Bluetooth connections, or the display system can be coupled to another device including such connections, such as a smartphone, tablet, portable web browser, video player, or laptop computer. Some AR systems provide a full field of view display that is always in the view of the user, while other AR systems may provide a small display provided at a portion of the view that the user must specifically look at to see, such as "smart" glasses.

In an example near eye display system, a projector is mounted to a wearable headset to provide the display information to the waveguide of the lens. The projector includes optical and reflective elements, such as lenses, mirrors and illumination sources. In some systems, a spatial light modulator ("SLM") provides the images from a video data source. The AR or VR glasses or headsets can become quite bulky, in order to provide the physical space needed for housing the projector including optics, the spatial light modulator, and illumination elements. Accordingly, the glasses or headset can become heavy and uncomfortable to the wearer. The wearer can experience chafing or injury to nose and ear areas that support the glasses or headset when the glasses or headset are worn over a period of time.

SUMMARY

A near eye display apparatus includes: a lens having a viewing area, the lens comprising a waveguide having a waveguide input and a waveguide output, and the waveguide output optically coupled to the viewing area; an optical projector having a projector output, the optical projector comprising an optical prism element, a spatial light modulator and an illumination source, the illumination source optically coupled to the optical prism element and configured to provide illumination light into the optical prism element at a particular direction, the spatial light modulator optically coupled to the optical prism element and configured to receive the illumination light from the optical prism element and to reflect patterned light, and the optical prism element configured to provide the patterned light to the projector output at the particular direction; and an optical folding element optically coupled between the projector output and the waveguide input, the optical folding element configured to fold an optical path of the patterned light in at least two different directions.

DETAILED DESCRIPTION

In the drawings, corresponding numerals and symbols generally refer to corresponding parts unless otherwise indicated. The drawings not necessarily drawn to scale.

In this description, when the term "coupled" describes relationships between elements, it is not limited to "connected" or "directly connected," but may also include connections made with intervening elements, and additional elements and various connections may exist between any elements that are "coupled." In this description, elements that are "optically coupled" have an optical connection between the elements, but various intervening elements can exist between elements that are "optically coupled."

In this description, an "in-line" optical projector is one where the illumination light path (which enters an optical system in a first direction) and the projection light path (where modulated light exits the optical system) are aligned in the same first direction. In those examples, the optical system uses prisms to reflect the illumination light entering the optical system to the face of a spatial light modulator, and the prisms then again reflect the modulated light (reflected or passed by the spatial light modulator) to exit the optical system in line with the illumination light path. In some examples, the face of the spatial light modulator has a planar surface that is oriented parallel to the in line optical path.

In this description, the term "optical folding element" means an element that changes a direction of a light path by reflecting light at an angle, thereby changing the direction of incoming light traveling in a first direction to a new direction that is angled relative to the first direction. In an example arrangement, an optical folding element folds a light path at least twice. In some examples, the optical folding element folds the light path at right angles, but other angles are possible.

The arrangements are applicable to both AR and VR near eye projector systems. Entertainment can be viewed using the VR or AR systems, such as 3D and 2D games, 2D and 3D movies, holograms, TV shows, video streams of events (both live and recorded or delayed), social media, and other visual presentations. Audio outputs can be used in conjunction with the system to add sound to the visual experiences, such as headphones, earphones, or ear buds (both wired and wireless, such as Bluetooth earbuds). A microphone can be incorporated to enable voice command operations from the user, and for use in voice calls, irrespective of whether using a cellular network or voice over internet protocol. Video conferencing can be performed.

To display visual information to the wearer of an AR or a VR headset, an optical projector is used with a near eye display. The near eye display can include a viewing display area coupled to the output of the projector by an optical waveguide in a lens. The waveguide or pairs of waveguides in some systems (each with a viewing area positioned in proximity to each eye, as in eyeglasses or goggles), provide (s) a screen for the user to look into and simultaneously look through.

In this description, a near eye display includes a compact in-line optical projector in conjunction with a transmissive lens, which includes a waveguide within the lens. The compact optical in-line projector can be mounted to the lens or the pair of lenses outside the field of view of a user, so they are not visible to the user. In an example, the compact in-line optical projector is mounted above the field of view and on a front surface of the lens, and has a form factor that can be made thin with respect to a distance extending from a front surface of the lens, so the compact optical projector does not extend far from the lens, and so it makes the wearable lens or lenses comfortable and useful for lengthy wear times, such as for all day wear. By reducing the thickness of the optical projector affixed to the lens or lenses, the near eye display system places less strain on the nose and the ears of the wearer than otherwise possible without use of the arrangements.

In an example arrangement, the compact in-line optical projector is coupled to the waveguides in the lens (or lenses) by an optical folding element that folds the light path at least twice. In an additional arrangement, the compact in-line projector can be mounted on the temple piece of an wearable near eye display, and the compact projector is mounted out of the field of view of the wearer, with an output at the front of the compact optical projector coupling to an optical input at the rear surface of a lens for viewing by the wearer, and the projector output is coupled to a waveguide in the lens by an optical folding element that folds the light path at least twice and thereby couples the projector output into an optical input for the lens. The arrangements are configurable to provide an augmented reality (AR) system where the waveguide is part of a transmissive lens, and the lens combines video images from the optical projector with the scene being viewed through the lens. In an alternative example, the arrangements are configured to be housed in or covered by an opaque covering in a virtual reality (VR) system, so the VR system displays images from the optical projector to the viewer looking into the lens, while nothing in front of the lens is visible to the wearer. In this manner, the same wearable near eye display is readily convertible from a VR to an AR application, and back again.

Example uses of the near eye display system include tourism, navigation, social media, training, simulators, and education arrangements, where the scene being viewed by the wearer is augmented with displayed information. A VR application can present gaming, movies (such as interactive and stereoscope, 2D or 3D movies and presentations), educational and business presentations, and other visual information. The system can be made interactive, such as by adding a microphone and having the system respond to spoken user commands. The compact optical projector can receive video for display from various sources, including smartphones, media players, portable computers, tablets, internet browsers or streaming devices, and can be coupled using cabling or Bluetooth or other over the air wireless interfaces, such as NFC or Wi-Fi, or using infrared interfaces. Game consoles and desktop computers, DVD players, media players, or other web interface devices can provide video for display. Audio devices (such as headphones, earbuds, earpods or speakers) can be combined with or used in conjunction with the wearable near eye display device.

In a display device formed without use of the arrangements, the optical projector system is mounted above the field of view of the wearer and extends away from the front surface of the lens, so a strap encircles the viewer's head (or a helmet is often used). In that example, the system is too large and bulky to be worn comfortably without the strap, while supported by the viewer's nose and ears. To form a system with viewer comfort similar to eyeglasses or headsets, the system should be supported by the viewer's nose and ears, without undue chafing or rubbing when worn for extended periods of time.

Figure 1:
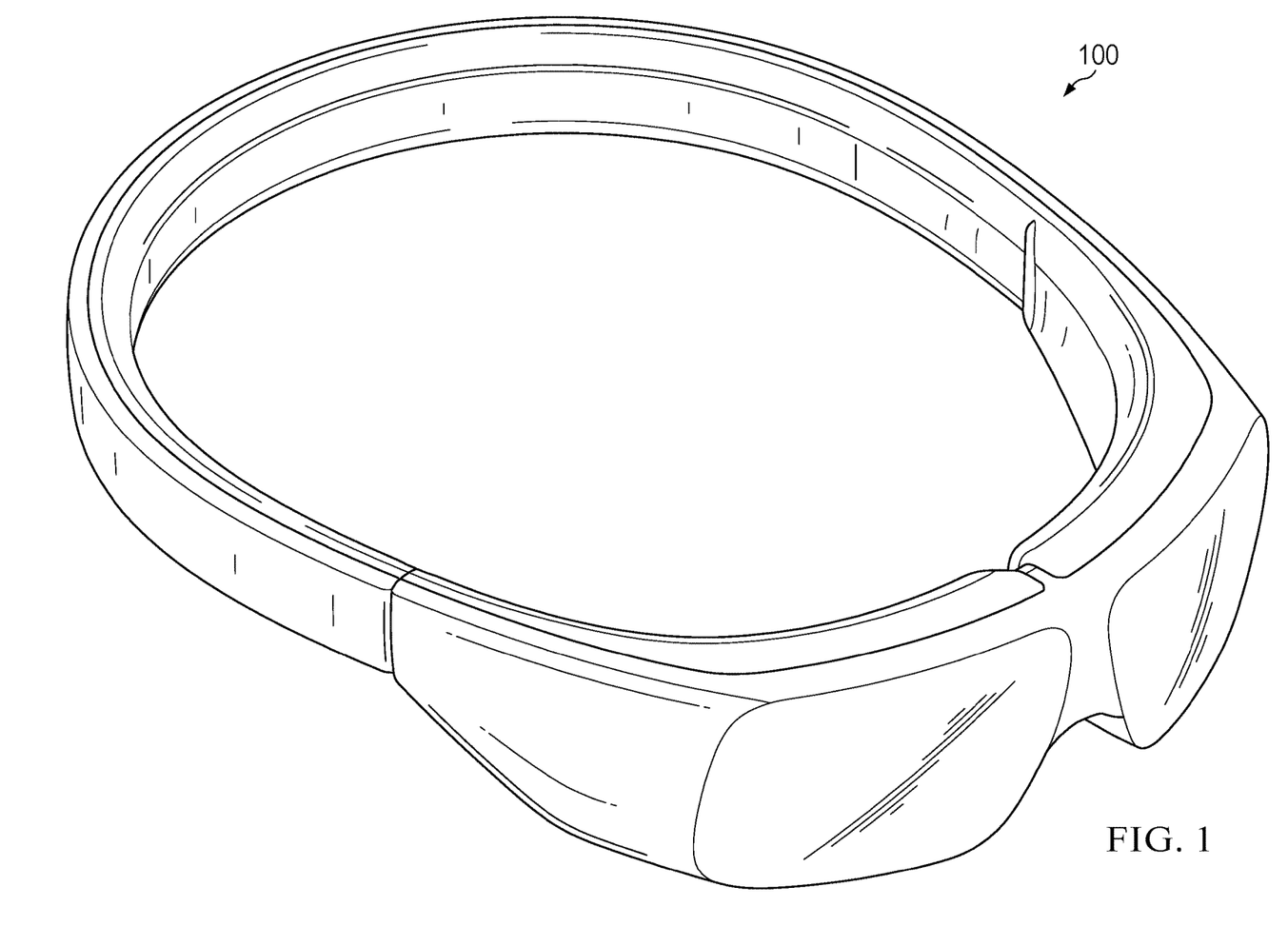
FIG. 1 is a simplified diagram of a near eye display system.

FIG. 1 depicts an example conventional near eye display system 100 for an AR application. In FIG. 1, a transmissive lens is mounted to a headset to be worn by a user. A projector system is integrated into the headset and coupled to the transmissive lens to provide augmented information (such as text, graphics, images or other viewable information) to be viewed in combination with the scene being observed through the lens while a user is wearing the system. For example, the added video for display to the wearer can include visual navigational cues. The transmissive lens is a visual combiner, so the scene observed by a wearer includes: the scene in front of the lens; and the text, graphics, or other displayed video images from the AR system projector. Because the lens and projector combination is bulky, a rear strap system straps the near eye display system onto the wearer's head. This rear strap relieves part of the strain that would otherwise be borne by the wearer's nose and ears, by transferring the strain onto the back of the head. Accordingly, the system becomes uncomfortable during periods of extended use, and it also looks unappealing when the device is worn, because the strap is behind and across the back of the user's head.

Figure 2:
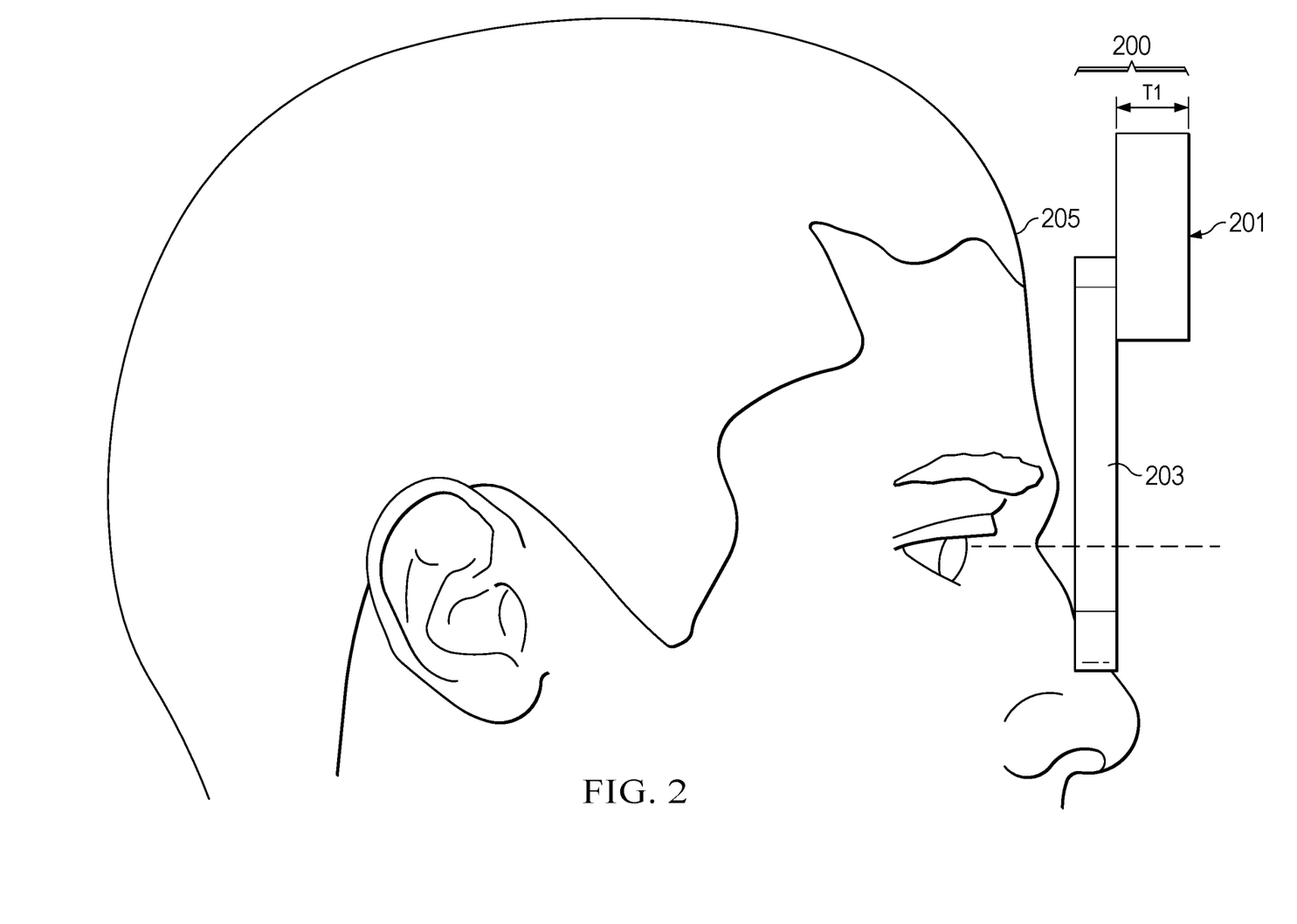
FIG. 2 is a simplified block diagram of a near eye display system using an optical projector.

FIG. 2 is a side view of an AR system 200 similar to the AR system 100. An optical projector system 201 with a folded architecture is attached to a front surface of lens 203, which is at least partially transmissive, so a wearer 205 who wears the system 200 views a rear surface of the lens 203 that is proximate to the wearer's eye(s). The wearer 205 can look into and through the lens 203 to observe a scene in front of the lens 203. The optical projector 201 has a thickness "T1" that extends from a front surface of the lens 203 and away from the wearer's eye. Because the thickness of the projector extends away from the front of the lens and away from the wearer's eye, the weight of the projector is supported primarily by the wearer's nose. As shown in FIG. 1, a rear strap or other support may be needed to transfer the weight and support to the back of the wearer's head, which reduces the discomfort that otherwise might occur if the system's weight rests on the wearer's nose. In FIG. 2, the thickness T1 of a folded architecture projector may be at least 12 millimeters and perhaps even thicker. The projector 201 extends away from the front surface of the lens by a distance that creates additional pressure on the nose of the wearer, and which makes the system uncomfortable when used for long periods of time, or even painful if the wearer's nose is rubbed or chafed.

Figure 3:
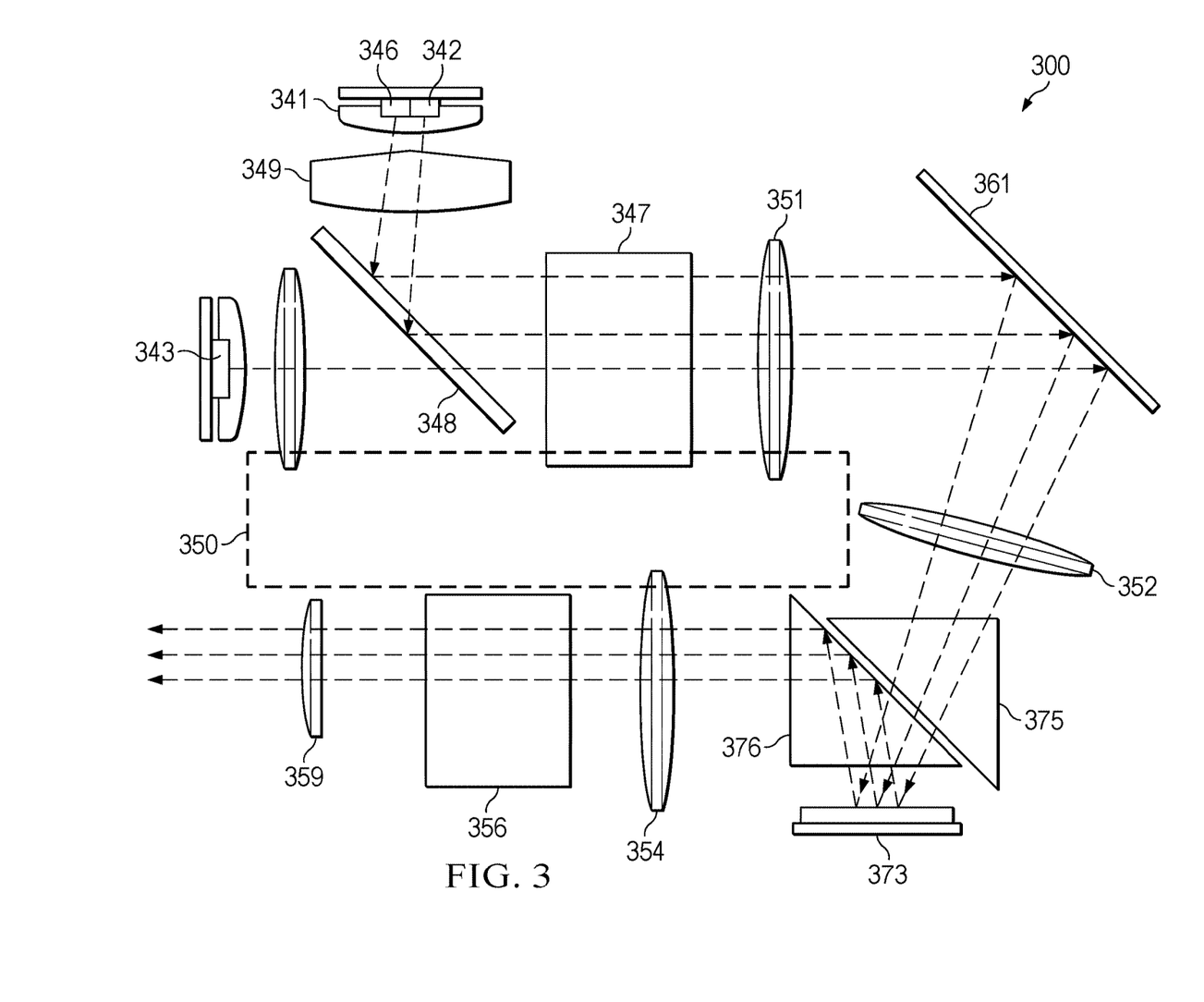
FIG. 3 is a simplified block diagram of major elements of an optical projection system.

FIG. 3 illustrates an example architecture for an optical projector 300 that has a spatial light modulator (SLM) to provide video images. In FIG. 3, illumination is provided by LEDs 343, 342 and 346, which can be red, green and blue in an example color illumination technique. However, alternative illumination sources can also be used, such as incandescent lamps with reflectors, single lamps with color wheels, laser, or laser-phosphor illumination. The LEDs can include an optical coating or collimating optics 341, which collect and collimate the light output by the LEDs. Also, as illustrated in FIG. 3, two LEDs 342 and 346 (such as red and green LEDs) are shown on a single integrated device, while the blue LED 343 is a separate component. Alternative systems (not shown for clarity of illustration) have three individual LED devices (red, green and blue), and two dichroic plates in the form of an X shape (a so-called "X-box" prism) combine the three colors red, green, blue (RGB) into a color illumination source. In the example of FIG. 3, dichroic plate 348 reflects the light from red LED 346 at one surface, reflects the light from green LED 342 at a second surface, and passes the light from blue LED 343 through the plate 348 and to the illumination path. In alternative arrangements, many LEDs can be used or multiple LEDs can be used for a color, instead of one LED per color.

In FIG. 3, an additional optical element, which is a collimator 349, is placed between the LEDs 342, 346 and the dichroic plate 348. Collimators reduce the light beam diverging angle. Integrator 347 is located in the illumination path after the dichroic plate 348. The integrator 347 may be a "flys-eye" integrator (also referred to as a lens array), or a rod integrator or tube integrator. The integrator produces a more homogeneous light beam, which can then be transmitted through one or more relay lenses, such as relay optics 351. The relay optics such as 351 extend the length of the illumination path.

In this example arrangement, mirror 361 folds the illumination light path. This reflective fold mirror also enables the illumination light rays to reach the spatial light modulator ("SLM") 373 at a desired angle. For example, SLM 373 may be a digital micromirror device ("DMD"). Because the DMD 373 modulates the light by tilting reflective mirrors while displaying a pattern, the illumination rays strike the mirrors at an angle. The folding mirror 361 makes control of the illumination light angle easier to achieve. Additional relay optics such as 352 can be located between the mirror 361 and the DMD 373.

To use a reflective spatial light modulator (SLM) such as DMD 373, the illumination light rays from mirror 361 that enter the DMD package, and the patterned light rays leaving the mirrors in SLM 373, are physically separated from each other to avoid interference with one another, as shown in FIG. 3. A reverse total internal reflection (RTIR) prism can separate the illumination system's light rays from the image rays that are transmitted into the projection optics. U.S. Pat. No. 5,309,188, titled "Coupling Prism Assembly and Projection System Using Same," which is hereby incorporated by reference in its entirety herein, discloses a prism arrangement using total internal reflection to separate the illumination and projection light paths in a relatively small space. As shown in FIG. 3, wedge prism 375 and TR prism 376 form a coupling prism that accomplishes the needed separation of the illumination light rays from the image light rays. The patterned light rays from SLM 373 exit prism 376 and are coupled into a projection system. In this example, the projection system includes elements 354, 356, and 359.

FIG. 3 illustrates a space 350 between: the light path formed by the LED light sources and illumination optics; and the light path for the projection optics for the modulated light reflected from the SLM to the output. This space 350 is not used as part of the optical path, but is nonetheless required by the architecture for the RTIR projection system 300. The space 350 is required to provide room for the light rays to traverse the optical path without interference in the RTIR folded architecture.

For an optical projector in a near-eye display device, a smaller physical area is desired. As shown in FIG. 2, the size and form factor of the projection system 201 can negatively impact the comfort and wearability of a wearable near eye projection system. The thickness of the projector, and especially the thickness (T1 in FIG. 2) extending away from the front of the transmissive lens, contributes to discomfort when the system is worn by a user.

Figure 4:
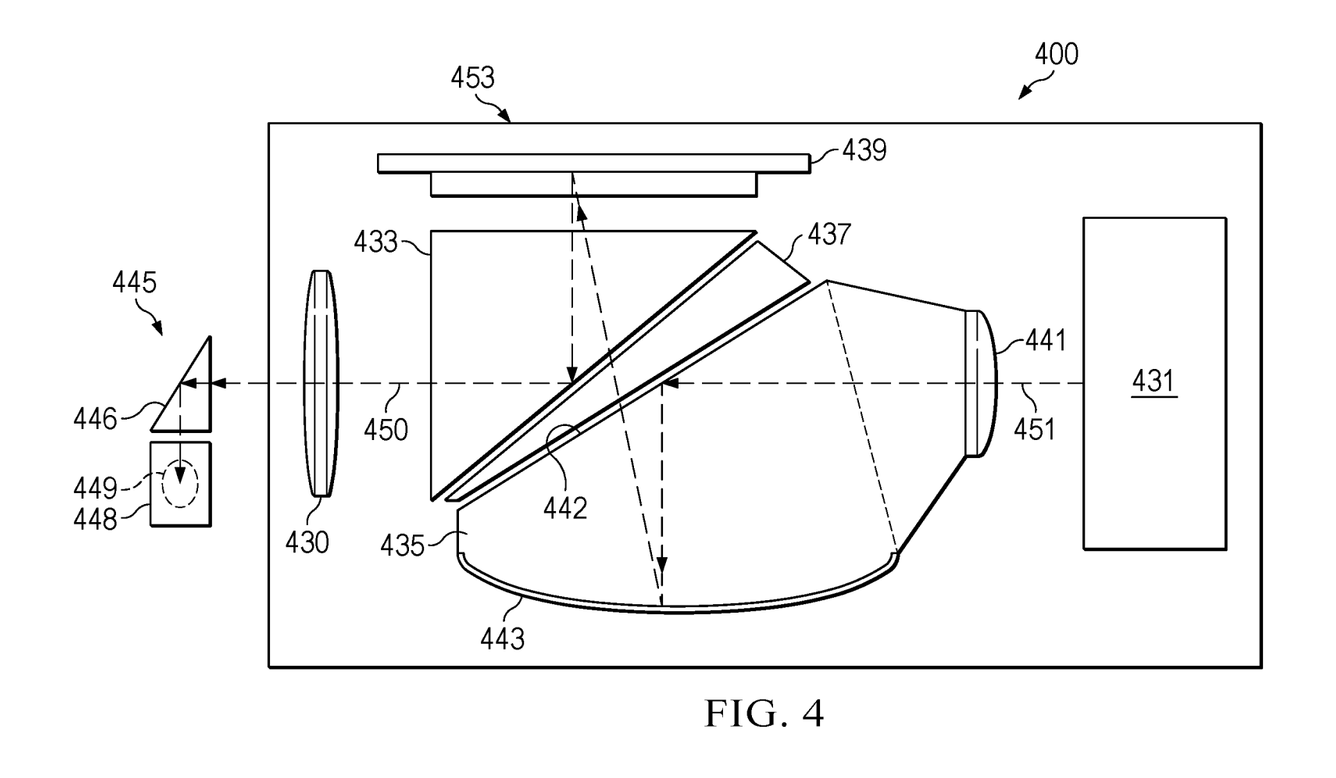
FIG. 4 is a simplified block diagram of an example arrangement for a compact optical projection system.

FIG. 4 illustrates, in a block diagram or plan view, a compact in-line projection system 400 for use with the arrangements. This compact projection system is similar to those described in U.S. Pat. No. 9,756,300, issued Sep. 5, 2017, which is hereby incorporated by reference in its entirety herein. A housing 453 protects the projection system from moisture, damage and extraneous light sources. Further, the housing 453 provides a visually appealing object. For example, the housing can be molded plastic, aluminum, ceramic, nylon, metal, etc. and can be sealed to be moisture resistant or can be made moisture proof. For example, it may be hermetically sealed. As shown in FIG. 4, an illumination element (simplified to block 431 in this diagram, for clarity of illustration) transmits light, such as red, green, blue (RGB) colored light beams along an illumination path represented by ray 451 in FIG. 4, into a cover prism 435 that includes an integrating surface 441, a total internal reflection (TIR) surface 442, and an asymmetric curved reflector 443. A wedge prism 437 is located on or adjacent one transmissive emission surface 442 of the cover prism 435 to further control the light path direction to a second reverse total internal reflection (RTIR) prism 433. Illumination light (represented by ray 451 in FIG. 4) enters the cover prism 435 and is reflected by the TIR surface 442 to the curved reflector surface 443, and is then reflected again and transmitted through the cover prism 435 and the wedge prism 437 and through the second prism 433, striking the surface of a spatial light modulator 439.

For example, the SLM 439 can be a digital micromirror device (DMD). In an arrangement using a DMD for the SLM 439, micromirrors on the DMD are loaded with modulation patterns corresponding to image data, and the micromirrors reflect the illumination light as patterned light, which then again enters the third prism 433 and strikes the RTIR surface. The patterned light is then reflected and leaves the prism 433 in a direction aligned with the direction that the illumination light entered the cover prism as represented by ray 450 in FIG. 4, and the projected patterned light is then output from the third prism to a projection optical element 430. The illumination light entering the cover prism (ray 451) and the patterned light (ray 450) are traveling in the same direction and in similar planes, so the illumination path and the patterned light path are "in-line" as shown in FIG. 4. The illumination light path and the patterned light path are not required to be directly aligned, but are in the same direction and parallel. The total volume for this in line optical projection system is greatly reduced (when compared to the folded RTIR architecture of FIG. 3). Also, the SLM 439 is positioned above the light paths 451, 450, (as the elements are oriented in FIG. 4), and the SLM 439 is positioned with a reflective surface parallel to a direction of the light traversing the system, and as the system is oriented in FIG. 4, thereby facing downwards relative to the third prism 433. In an alternative arrangement (not shown), the cover prism, the wedge prism and the third prism can be rotated about the "in-line" light path, so the SLM 439 can be located beneath the light path (as the elements are oriented in FIG. 4), and so the SLM 439 would instead face upwards relative to the cover prism 435, the wedge prism 437 and the third prism 433.

In the illustrated arrangement, the projection optics optically couple the patterned light beams out from the system 400 and into an optical folding element 445. The optical folding element 445 folds the light in the projected patterned light at least twice, including once downward (as oriented in FIG. 4) and then again to transmit the light towards the viewer of FIG. 4, which is out of the page. As described below, the patterned light beams can be coupled to the input portion of a waveguide in a transmissive lens of the near eye display. Pupil 449 represents the output of the optical folding element 445. In additional alternative arrangements, other reflective SLM devices can be used, such as a liquid crystal on silicon (LCoS) SLM. Useful DMD devices are available in various sizes from Texas Instruments Incorporated. The optical folding element can fold the light path at right angles, or at other angles, and additional reflective elements can fold the light path more than twice, to form alternative arrangements. In this example, the optical folding element first folds the light path from the projector downwards and parallel to a front surface of a lens, and then folds the light path a second time, to direct the light perpendicular to the surface of the lens and into the an optical input, which is optically coupled to a waveguide within the lens. Alternative arrangements could fold the light upwards first, or in some other direction, and the optical input can be placed in different areas of the lens, such as at an outside or peripheral portion, instead of the central portion as shown in the drawings. Many alternative arrangements are possible.

Figure 5A:
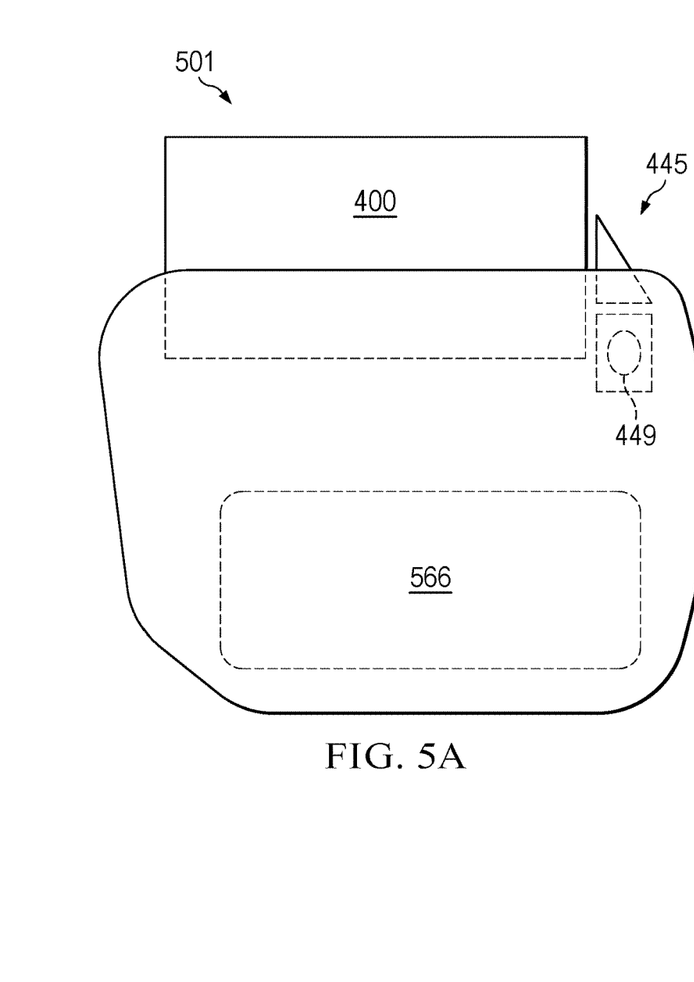
FIGS. 5A and 5B are a plan view and a side view, respectively, of an example illustrative arrangement for a near eye display system.
Figure 5B:
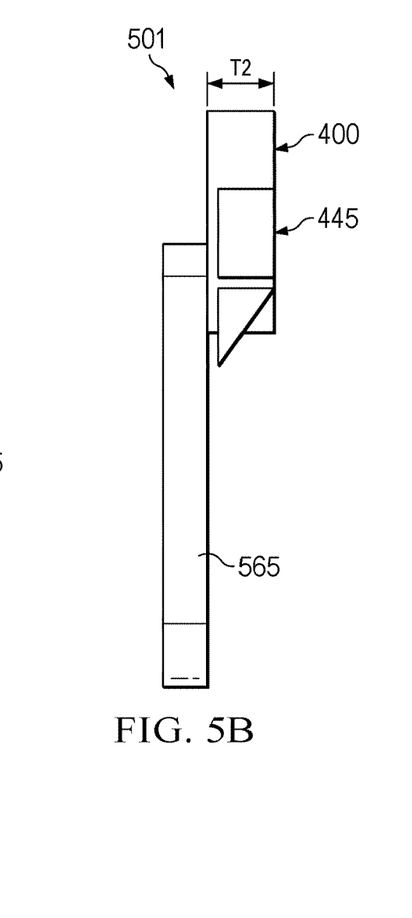

FIGS. 5A and 5B show a system 501 in: a plan view looking into the rear surface of a transmissive lens 561 (FIG. 5A); and a side view looking at the side of the transmissive lens 561 (FIG. 5B). In FIG. 5A, compact optical system 400 is coupled to the optical folding element 445. The optical folding element 445 has an output 449 optically coupled to an input portion of the transmissive lens 565. The transmissive lens 565 has an internal waveguide (not shown) that couples the projected image to a display portion 566 in the lens, and has an "eye box" arranged to fill the wearer's field of view. The waveguide includes internally reflective optical surfaces to form an internal light path, so the patterned light output from the compact optical projector 400 can be transmitted to the eye box portion 566 of the lens 565.

FIG. 5B shows a side view of the lens 565 with an internal waveguide. The optical folding element 445 couples the output of the compact projector 400 to an input for the waveguide in lens 565. As shown in FIG. 5B, a thickness T2 of the compact optical projector and the optical folding element 445 is thinner than the thickness T1 in FIG. 2. In examples, the thickness T2 is less than 10 millimeters, and can be as thin as 6 millimeters. The compact projector and the optical folding element provide an image into the transmissive lens. Such image is observable by the viewer. In these arrangements, the image has a landscape orientation, which is wider from side to side than its height from top to bottom. This image orientation can be matched to the orientation of the DMD device, so the landscape orientation of the DMD uses all pixel area efficiently.

Figure 6A:
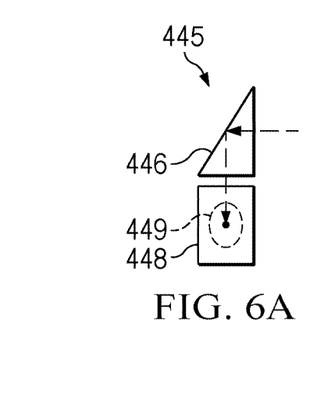
FIGS. 6A and 6B are a front view and a side view, respectively, of an optical folding element of certain arrangements.
Figure 6B:
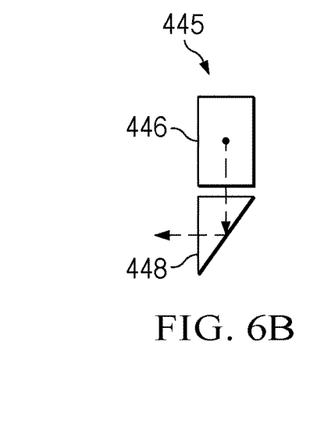

FIGS. 6A and 6B show a front view and a side view, respectively, of the optical folding element 445. In the illustrated example, the optical surfaces in the optical folding element are flat. But in alternative examples, curved surfaces (and other shapes) are useful to improve image quality seen by the wearer. In FIG. 6A, the light from the compact projector (such as 400 in FIG. 5A, 5B) enters a surface of a first TIR prism 446, in a direction parallel to the compact projector's in-line optical path. The light is then first folded by reflection in a direction (downwards in this example) normal to the first direction, and into a second TIR prism 448, which sits beneath the first prism. The light is then folded a second time (in this example, in a normal direction again) by reflection to direct it towards the lens (not shown) or into the page in FIG. 6A. In FIG. 6B, a side view illustrates the second folding, in which the light enters the second prism 448 from prism 446 above it, and is reflected out of prism 448 towards the lens. By folding the light path traversed by the patterned light at least twice, the light is moved downwards from the output of the optical projector and is then reflected into the input for the waveguide in the lens. In these arrangements, the compact projector can be located above the field of view of the wearer of the near eye display system, so the optical projector is out of the wearer's view. In the illustrated example, both folds in the light path are at right angles (90 degrees). But in alternative arrangements, the light path is folded at other angles. Other arrangements can add more optical elements to the optical folding element 445, in order to fold the light path more than twice, such as three times. Curved surfaces can be used instead of flat surfaces in the optical folding element 445.

Figure 7:
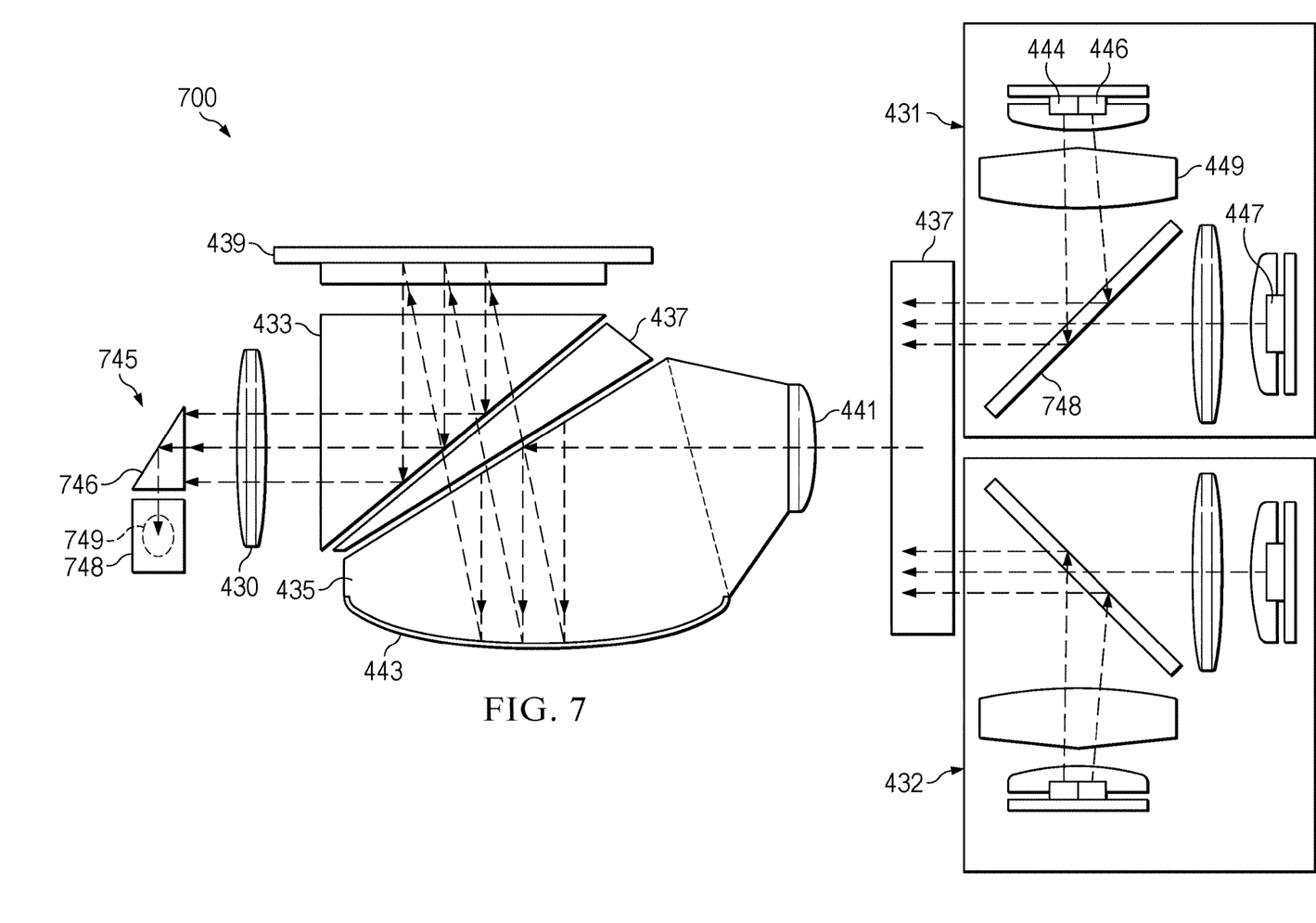
FIG. 7 is another block diagram of an alternative arrangement having two illumination sources and a single spatial light modulator to provide video for a near eye display system.

FIG. 7 is a plan view of an alternative arrangement using two illumination sources 431, 432. The illumination sources 431, 432 output illumination light for use with a spatial light modulator 439, such as a DMD. Each illumination source includes a red LED and a green LED, such as 444 and 446 in illumination source 431, a dichroic element 748 that reflects the red and green light at different sources, and a blue LED 447 whose light is transmitted through element 748. By time multiplexing the two illumination sources 431, 432 in synchronization with changing the respective modulation patterns on the SLM 439, the arrangement for a compact projection 700 can produce video images for use with two lenses in a near eye display, such as with one lens per eye of a wearer. By displaying different video images to the left and right lenses for respective viewing by the left and right eyes of the wearer, stereoscopic images (including 3D images with perception of depth) can be projected for view. The use of different images for left and right eyes can create depth perception, which is useful in 3D movies and television, simulators and training, 3D gaming systems, and holograms or stereograms.

In FIG. 7, the cover prism 435 (with reflective surfaces and an asymmetric reflector 443) is the same as shown in FIG. 4, and it outputs the illumination light received at surface 441 through the wedge prism 437 and into the second prism 433, and then onto the mirrors of the spatial light modulator 439. Modulated light is reflected from the SLM 439 into the second prism 433, and internally reflected out of the second prism 433 to exit in the same direction as the illumination rays entered the cover prism 435, so the compact projector 700 is an in-line optical projector as described above with respect to FIG. 4. From the second prism 433, the modulated light passes through projection optics 430, out of the in-line optical projector, and into the optical folding element 745. Projection optics 430 can include several optical elements, but is shown as one optical element for clarity of illustration.

Figure 8:
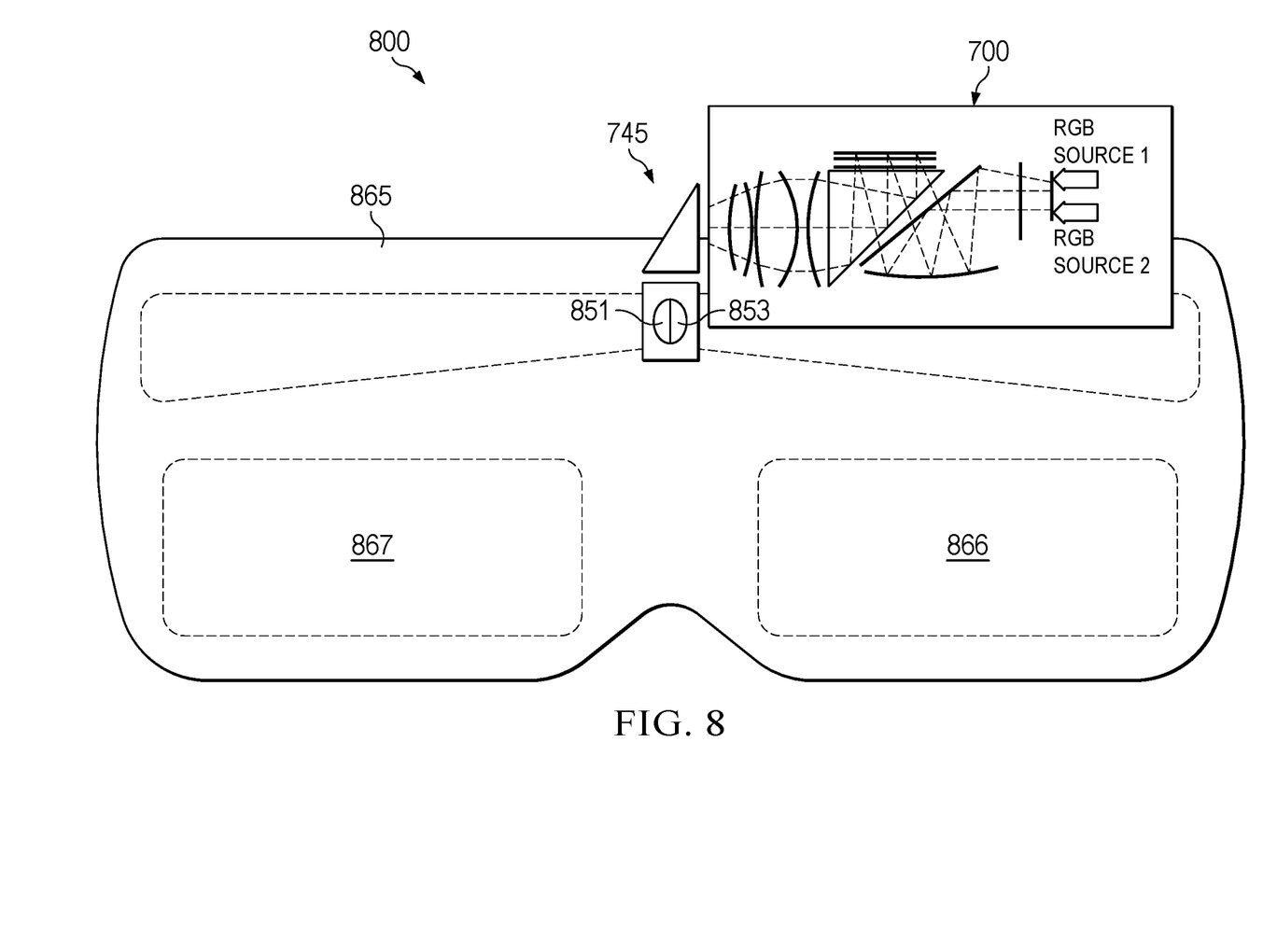
FIG. 8 is a front view of an arrangement for a wearable near eye display system using the projector of FIG. 7.

The optical folding element 745 is similar to the optical folding element 445 of FIG. 4. In this example, the output pupil 749 has left and right sides for coupling into respective left and right lens optical inputs on an external surface of a pair of transmissive lenses, which are arranged in a near eye display system (as shown in FIG. 8 described below). By operating the illumination systems 431 and 432 separately, while contemporaneously displaying corresponding RGB modulation patterns on the SLM 439, left and right image data can be projected to the individual lenses of the pair of transmissive lenses.

FIG. 8 is a front view of a portion of a near eye display system 800, which has left and lenses in glasses 865 for viewing by a wearer's left and right eyes, respectively. The system 800 includes the compact optical projector 700 from FIG. 7, which has in-line optical projection and two illumination sources. The compact optical projector is mounted above the field of view of a wearer of the near eye display system 865. It can include a pair of lenses coupled in the center to form one element, as shown in FIG. 8. The optical folding element 745 receives modulated light from the projector 700 and folds it twice (once downward and once into an optical input of the eyeglass 865) to couple the modulated light to left and right input pupils 853, 851. Each input pupil 853, 851 is coupled to a respective expansion lens and then to a respective reflective waveguide. The reflective waveguides transmit the expanded images to corresponding left and right eye boxes 866 and 867 for viewing by a wearer. The left and right images are time multiplexed using the two illumination sources to project different images to the viewer's left and right eyes, although some arrangements may project the same images to both eyes. The system 800 can be used as a VR system, where the viewer looks through the viewing area, and the lens optically combines projected video images with a scene in front of the wearer. Also, by adding an opaque shield or cover, the system 800 is useful as an AR display device (described below), where the viewer sees only images from the projector 700. For example, a 3D movie or 3D game video could be displayed to the viewer.

Figure 9A:
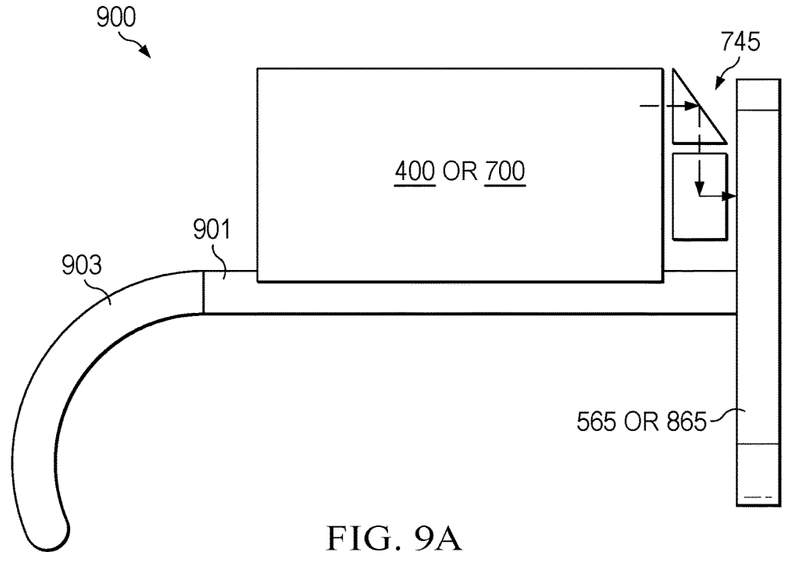
FIGS. 9A and 9B are a side view and a top view, respectively, of an example arrangement that incorporates the compact optical projectors of FIG. 4 or FIG. 7 mounted to a temple piece in a wearable near eye display system.
Figure 9B:
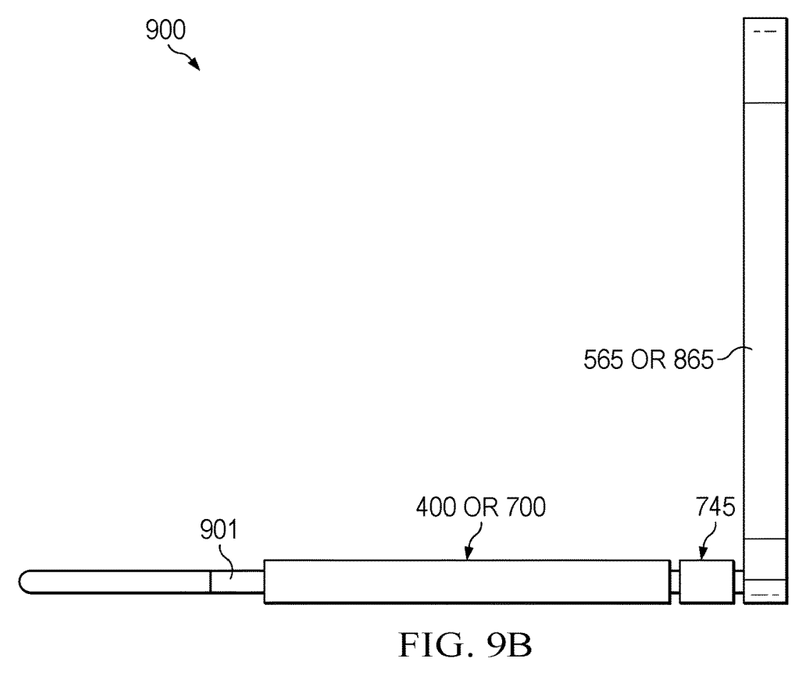

FIGS. 9A and 9B illustrate alternative arrangements that can be formed using the compact optical projector, which has in-line projection and an optical folding element with a transmissive lens including a waveguide, as described above. FIG. 9A shows a side view of a system 900, and FIG. 9B shows a top view. FIGS. 9A and 9B show a single lens element 565 or a dual lens 865, and images can be projected to one or both lenses. As shown most clearly in FIG. 9A, in this alternative arrangement, the compact optical projector (400 or 700 as described above) can be mounted to a temple piece of a wearable near eye display, and the compact optical projector's output is directed forward towards an optical input at the rear surface of the lens (565 or 865 as described above). The modulated light from the compact optical projector is directed into an input pupil for the lens elements. In another alternative arrangement, the housing of the compact optical projector and the temple piece of the wearable near eye display are combined into a single housing. The compact optical projector can supply images for one or both lenses in a system as described above. A further alternative arrangement has a respective compact optical projector per lens, so a first compact optical projector is mounted on a right temple piece, and a second compact optical projector is mounted on a left temple piece, but the second compact optical projector increases the system's overall cost and weight. To support and further secure the near eye display system 900, an earpiece 903 is attached to the temple 901. The in-line compact optical projector's reduced size enhances the wearer's comfort in this arrangement.

Figure 10:
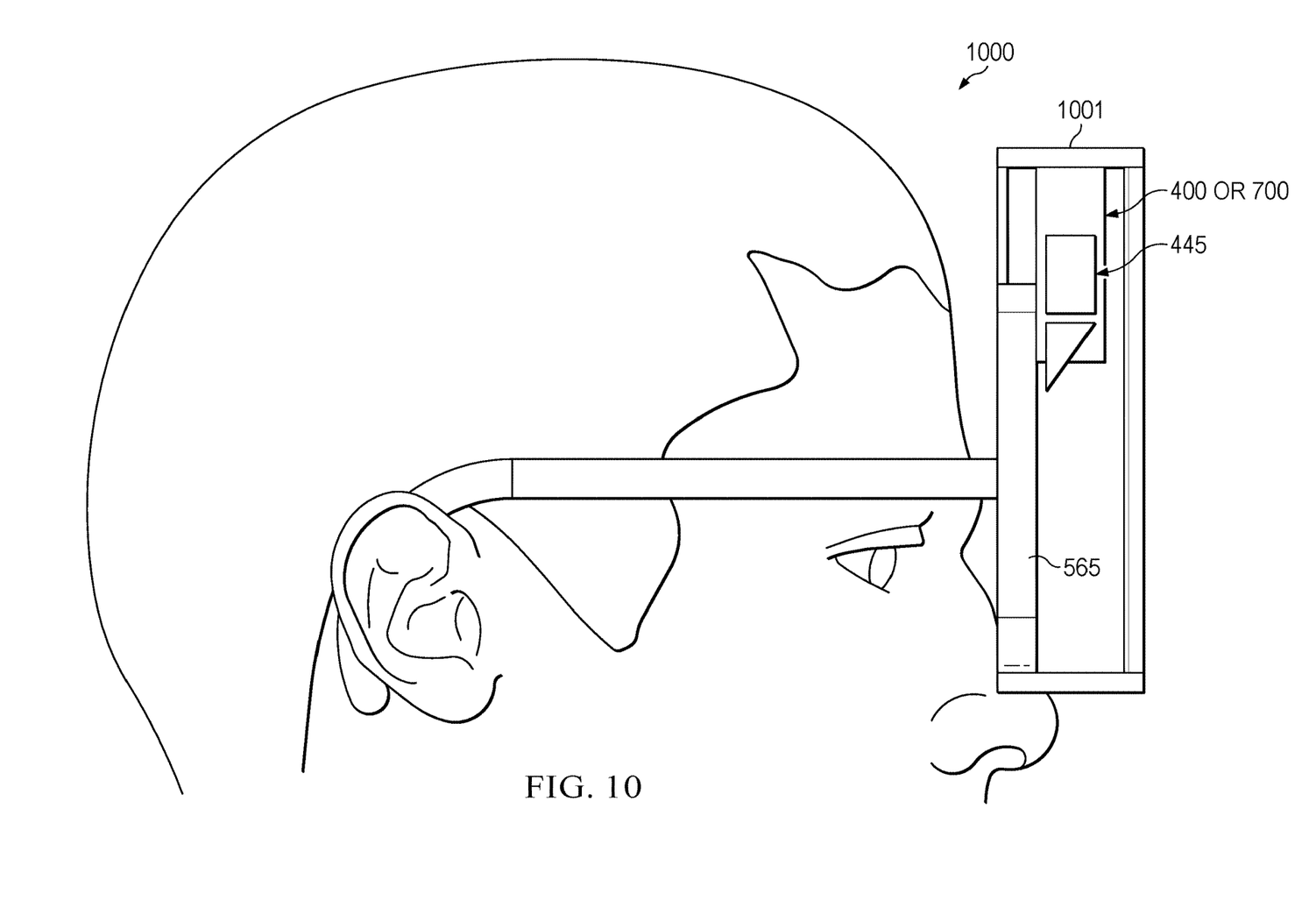
FIG. 10 is a side view of a VR system arrangement that incorporates the near eye system features in the arrangements of FIG. 5 and FIG. 8, the example compact optical projection system of FIG. 4, and an opaque cover to block unwanted light.

FIG. 10 is a side view of an arrangement where the near eye display systems described above are adapted for use as an AR system 1000. In FIG. 10, the wearable near eye display (such as shown in FIG. 5) is adapted by adding an opaque cover or shield 1001 over the lens 565 to block ambient light, while also preventing the wearer from viewing objects in front of the lens 565. The compact optical projections 400 and optical folding element 445 are again coupled to lens 565, so video images are displayed to the viewer in a viewing area (not visible in the side view of FIG. 10) of lens 565. In this manner, the near eye display system can operate as an immersive VR system.

Figure 11:
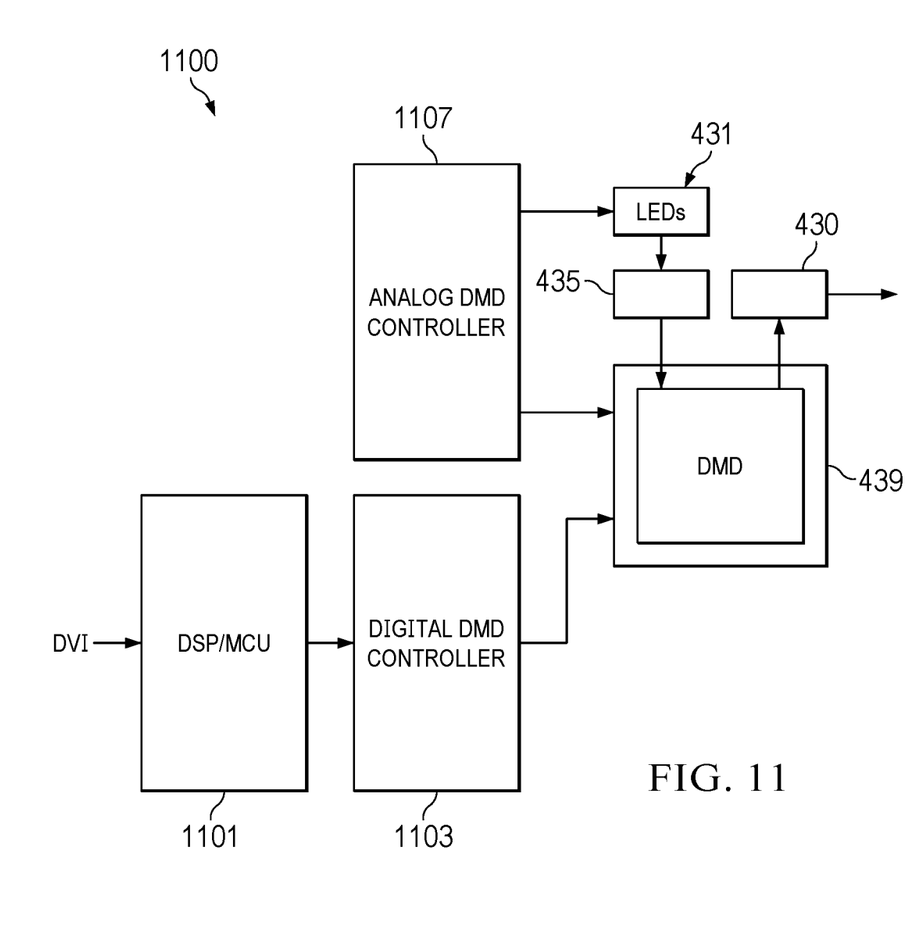
FIG. 11 is a simplified circuit diagram of an optical projection system incorporating features of this description.

FIG. 11 is a block diagram of additional circuitry for a projector system. A spatial light modulator (such as a DMD) includes various electrical components (such as electronic circuitry) to load digital video information (DVI) for display into the spatial light modulator, and to control the illumination sources (such as LEDs or lamps) for the spatial light modulator. FIG. 11 is a simple circuit diagram of an example arrangement 1100 for use with the compact optical projection system described above. A microprocessor, mixed signal processor, digital signal processor (DSP), microcontroller unit (MCU) or other programmable device 1101 executes instructions that cause it to output digital video signals for display. A variety of sources may provide the digital video signals labeled DVI in FIG. 11, such as Internet browsers, stored files in video cards, flash cards, USB drives, solid state drives (SSDs), cameras, personal computers, game consoles, smartphones, camcorders, etc. The microprocessor 1101 is coupled to a digital DMD controller 1103, which is another digital video processing integrated circuit. An analog controller IC 1107 controls intensity and power of the illumination source 431. The DMD controller 1103 provides digital data to the DMD 439 for modulating the illumination light that strikes the DMD surface, and the analog DMD controller 1107 provides power and analog signals to the DMD 439. The light rays from the illumination sources LEDs 431 are provided to the illumination components 435, such as the cover prism and wedge described above, and the light rays strike the mirrors of DMD 439. The reflected light for projection leaves the surface of the DMD 439 and travels into the projection optics 430 as described above. Together, the integrated circuits 1103, 1107 cause the DMD 439 and the optical components to project the digital video signals as an image.

Example integrated circuits of FIG. 11 include mixed signal processors available from Texas Instruments Incorporated, such as any of the MSP430AFE family of processors. Examples of useful DMD controller ICs include the DLPC3430 DMD controller, and the DLPC2601 ASIC device that can provide both digital and analog controller functions. Useful analog DMD controller devices from Texas Instruments Incorporated include the DLPA2000 device. LED controller devices can be used to power on and off the RGB LEDs, for example. Combined analog and digital DMD controllers devices can provide signals to the DMD and signals for controlling the illumination source, such as the DLPC300.

The spatial light modulator DMD 439 can be a digital micromirror device (DMD) commercially available from Texas Instruments Incorporated in various sizes. Available DMD devices include: VSP ("very small pixel") technology devices, which provide an array of diamond shaped micromirrors that tilt on a diagonal axis in a +/−12 degree tilt from a flat position; and TRP ("tilt and roll pixel") technology devices, which provide an array of block shaped micromirrors that tilt in a compound motion, first horizontally in one direction, and then vertically in a second direction, at a +/−17 degree tilt from a flat position. DMD devices from other sources can also be used. Each DMD device provides thousands or even millions of micromirrors that are individually addressable by changing a stored value in a memory cell of each micromirror.

For implementing a complete projection system, analog and digital control ICs for the DMD devices and for providing power to red, green and blue LEDs, and to lens focusing motors, are also available from Texas Instruments Incorporated. DMD devices from Texas Instruments Incorporated include the DLP2010DMD, which is a 0.2 inch diagonal device that provides wide VGA (WVGA) resolution. Many other DMD devices are available. Although these Texas Instruments Incorporated devices are listed here as examples of integrated circuits that are useful with the arrangements of this description, many other integrated circuits are useful too.

In alternative arrangements that also incorporate additional aspects of this description, other types of spatial light modulator devices can be used to implement the spatial light modulator 439. For example, liquid-crystal-on-silicon (LCoS) devices can be used. These devices, like the digital micromirror devices (DMDs), include reflective elements that are individually controllable to modulate the image into the projected light rays. LCD spatial light modulators can also be used. These additional alternative arrangements provide additional advantageous aspects of this description.

Modifications are possible in the described examples, and other examples are possible, within the scope of the claims.

What is claimed is:

1. A display apparatus, comprising:
a lens comprising a waveguide;
an optical projector comprising:
  a prism;
  a spatial light modulator optically coupled to the prism; and
  an illumination source optically coupled to the prism, the illumination source configured to provide illumination light to the prism in a first direction, the spatial light modulator configured to receive the illumination light from the prism and to produce patterned light based on the illumination light, and the prism configured to provide the patterned light in the first direction; and
an optical folding element optically coupled between the optical projector and the waveguide, the optical folding element comprising:
  a first total internal reflection (TIR) prism configured to reflect the patterned light in a second direction as first reflected light; and
  a second TIR prism optically coupled to the first TIR prism, the second TIR prism configured to reflect the first reflected light in a third direction as second reflected light, the third direction different than the first direction and the second direction.

2. The display apparatus of claim 1, wherein the lens is at least partially transmissive, the lens configured to optically combine objects in a scene in front of the lens with the second reflected light.

3. The display apparatus of claim 1, further comprising an opaque cover over the lens.

4. The display apparatus of claim 1, wherein the prism is a cover prism having a curved surface and a straight surface, the straight surface configured to receive the illumination light from the illumination source, the straight surface configured to internally reflect the illumination light received through the cover prism towards the curved surface, the curved surface configured to reflect the illumination light back through the cover prism and through the straight surface, the optical projector further comprising:

a reverse total internal reflection (RTIR) prism optically coupled between the spatial light modulator and the straight surface of the cover prism, the RTIR prism having an output surface and a total internal reflection surface, the total internal reflection surface configured to receive the illumination light from the straight surface of the cover prism to travel through the RTIR prism to the spatial light modulator, and the total internal reflection surface configured to receive the patterned light from the spatial light modulator and to totally internally reflect the patterned light and direct the patterned light towards the output surface of the RTIR prism; and projection optics configured to receive the patterned light from the output surface of the RTIR prism and to project the patterned light.

5. The display apparatus of claim 1, wherein the optical folding element is configured to fold the patterned light more than twice.

6. The display apparatus of claim 1, wherein the second direction is perpendicular to the first direction and the third direction is perpendicular to the second direction.

7. The display apparatus of claim 1, wherein the spatial light modulator is a digital micromirror device (DMD) or a liquid-crystal-on-silicon (LCoS) device.

8. The display apparatus of claim 1, wherein the illumination source is configured to output illumination light in three different colors.

9. The display apparatus of claim 1, further comprising an image processor coupled to the spatial light modulator, the image processor configured to provide image data for display on the spatial light modulator to pattern the illumination light.

10. The display apparatus of claim 1, wherein:

the illumination source is a first illumination source and the illumination light is first illumination light, and the display apparatus further comprises a second illumination source configured to provide second illumination light to the optical projector; and the lens is a first transmissive lens, and the display apparatus further comprises a second transmissive lens that is optically coupled to the optical projector by the optical folding element, the optical folding element having a first output and a second output, the first output configured to output the patterned light to the first transmissive lens and the second output configured to output the patterned light to the second transmissive lens.

11. The display apparatus of claim 10, wherein the first illumination source and the second illumination source are configured to operate time multiplexed with the spatial light modulator to provide the patterned light to the first transmissive lens and the second transmissive lens, the first and second transmissive lenses configured to provide images in respective first and second viewing areas.

12. The display apparatus of claim 1, wherein the optical projector is in a package mounted to the lens above a field of vision.

13. The display apparatus of claim 12, wherein the package has a length, a height, and thickness extending away from the lens, and the thickness is less than 12 millimeters.

14. The display apparatus of claim 12, wherein the package has a length, a height, and thickness extending away from the lens, and the thickness is 6 millimeters or less.

15. The display apparatus of claim 12, wherein the folding optical element is mounted to the lens adjacent to the package.

16. A system comprising:
a reverse total internal refraction (RTIR) prism;
a cover prism optically coupled to the RTIR prism, the cover prism configured to:
receive illumination light; and
direct the illumination light towards the RTIR prism;
a spatial light modulator (SLM) optically coupled to the RTIR prism, the RTIR prism configured to direct the illumination light towards the SLM, the SLM configured to modulate the illumination light to produce modulated light;
an optical folding element;
projection optics optically coupled to the optical folding element and to the RTIR prism, wherein the RTIR prism is configured to direct the modulated light towards the projection optics, the projection optics is configured to direct the modulated light towards the optical folding element, and the optical folding element is configured to:
receive the modulated light in a first direction;
direct the modulated light in a second direction as directed light, the second direction different than the first direction; and
direct the modulated light in a third direction as output light, the third direction different than the first direction and the second direction.

17. The system of claim 16, further comprising a lens comprising a waveguide, the waveguide optically coupled to the optical folding element, wherein the waveguide is configured to receive the output light.

18. The system of claim 17, wherein the optical folding element comprises:
a first total internal reflection (TIR) prism configured to reflect the modulated light in the second direction as first reflected light; and
a second TIR prism optically coupled to the first TIR prism, the second TIR prism configured to reflect the first reflected light in the third direction as the output light, the third direction different than the first direction and the second direction.

19. The system of claim 16, wherein the second direction is perpendicular to the first direction and the third direction is perpendicular to the second direction.

20. The system of claim 16, further comprising a wedge prism optically coupled between the cover prism and the RTIR prism.

21. The system of claim 16, further comprising a light source optically coupled to the cover prism, the light source configured to produce the illumination light.

22. The system of claim 21, wherein the light source is a first light source and the illumination light is first illumination light, the system further comprising:
a wedge prism optically coupled between the first light source and the cover prism; and
a second light source optically coupled to the wedge prism, the second light source configured to produce second illumination light.

23. A near-eye display comprising:
a temple piece;
a housing on the temple piece;

a projection system in the housing, the projection system configured to produce modulated light;

a lens comprising a waveguide; and an optical folding element optically coupled to the projection system and to the waveguide, the optical folding element comprising:

a first total internal reflection (TIR) prism configured to receive the modulated light in a first direction and reflect the modulated light in a second direction as first reflected light; and a second TIR prism configured to reflect the first reflected light in a third direction towards the waveguide, the third direction different than the first direction and the second direction.

24. The near-eye display of claim 23, wherein the housing is integrated in the temple piece.

25. The near-eye display of claim 23, wherein the housing is mounted on the temple piece.

\* \* \* \* \*